US012103797B2

(12) United States Patent
Hirao

(10) Patent No.: US 12,103,797 B2
(45) Date of Patent: Oct. 1, 2024

(54) READING APPARATUS, CONTROL METHOD FOR READING APPARATUS, AND STORAGE MEDIUM

(71) Applicant: CANON KABUSHIKI KAISHA, Tokyo (JP)

(72) Inventor: Toyomi Hirao, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 17/375,953

(22) Filed: Jul. 14, 2021

(65) Prior Publication Data
US 2022/0024708 A1  Jan. 27, 2022

(30) Foreign Application Priority Data
Jul. 22, 2020 (JP) ................................. 2020-125735

(51) Int. Cl.
*B65H 1/14* (2006.01)
*B65H 7/18* (2006.01)
*B65H 7/20* (2006.01)

(52) U.S. Cl.
CPC ................. *B65H 1/14* (2013.01); *B65H 7/18* (2013.01); *B65H 7/20* (2013.01); *B65H 2511/414* (2013.01); *B65H 2513/51* (2013.01); *B65H 2513/512* (2013.01); *B65H 2513/52* (2013.01)

(58) Field of Classification Search
CPC ... B65H 1/08; B65H 1/14; B65H 7/00; B65H 7/18; B65H 7/20; B65H 2511/414; B65H 2513/512; B65H 2513/52
See application file for complete search history.

(56) References Cited

U.S. PATENT DOCUMENTS

| | | | |
|---|---|---|---|
| 2009/0224462 A1* | 9/2009 | Yamamoto | B65H 1/14 271/18 |
| 2010/0025919 A1* | 2/2010 | Okumura | B65H 3/0607 271/12 |
| 2021/0171299 A1* | 6/2021 | Mizumukai | B65H 3/0669 |

FOREIGN PATENT DOCUMENTS

| | | | |
|---|---|---|---|
| JP | 2001350225 A | 12/2001 | |
| JP | 2005263452 A | 9/2005 | |

* cited by examiner

*Primary Examiner* — Prasad V Gokhale
(74) *Attorney, Agent, or Firm* — Canon U.S.A., Inc. IP Division

(57) ABSTRACT

A reading apparatus to convey a document set on a document tray and to read an image of the conveyed document includes a control unit and a determining unit. The control unit performs lifting control for lifting the document tray in a case where a first condition is satisfied and performs lowering control for lowering the document tray in a case where a second condition is satisfied. The determining unit determines whether a predetermined period elapses after the lifting control of previous time is started. The control unit does not perform the lowering control even if the second condition is satisfied in a case where the determining unit determines that the predetermined period does not elapse.

18 Claims, 15 Drawing Sheets

READING APPARATUS, CONTROL METHOD FOR READING APPARATUS, AND STORAGE MEDIUM

BACKGROUND

Field

The present disclosure relates to a reading apparatus equipped with an automatic document feeder of which a document tray is driven up/down, a control method for the reading apparatus, and a storage medium storing a control program for the reading apparatus.

Description of the Related Art

There is known a document reading apparatus that consists of an automatic document feeder (hereinafter, referred to as an ADF) and a document reading unit. The document reading apparatus conveys documents stacked on a document tray of an ADF one by one to a predetermined reading position (hereinafter referred to as a flow reading position) of a fixed image sensor in the document reading unit. Thereby, a scan operation (hereinafter referred to as flow reading) that continuously reads the documents conveyed by the ADF is performed in general.

Japanese Laid-Open Patent Publication (Kokai) No. 2005-263452 (JP 2005-263452A) suggests an ADF that presses documents to a feed roller of a feed unit by lifting a document tray when a document detection sensor detects that there is a document on the document tray.

Moreover, Japanese Laid-Open Patent Publication (Kokai) No. 2001-350225 (JP 2001-350225A) discloses a technique that a sensor detects a sheet size of each document when an ADF conveys documents of different sizes on a document tray one by one to a reading position of an image sensor. This enables a scan operation suitable to a sheet size of a conveyed document.

In general, a conventional document reading apparatus reads documents of standard sizes (A3, A4, B4, B5, etc.) defined by ISO216 and JIS P 0138 stacked on a document tray (reading of standard-size mixed documents). In the meantime, in recent years, there is a request to stack documents, such as a receipt and a check, of sizes that do not correspond to the above-mentioned standard sizes on a document tray and to read them (reading of nonstandard-size mixed documents). For example, when a business-form processing application for a cash receipt and disbursement process is installed as a function of an image forming apparatus, reading of nonstandard-size mixed documents is required during execution of this application.

Against this, reading of standard-size mixed documents is required during execution of a copy process or a send process, which is a traditional function of the image forming apparatus. In this way, when each of applications installed in an image forming apparatus is executed, a document reading process, a post-process of the read document, and an image process that a user requires are performed according to a method suitable for the application under execution.

When standard-size mixed documents are read, documents are stacked so as to contact a document guide provided on a document tray of an ADF in order to prevent a document from being conveyed aslant (what is called skew) during feed conveyance. Thereby, the documents on the document tray are conveyed one by one with a feed roller of the ADF without skew (FIG. 4A), and each document is read by a document reading unit.

However, when nonstandard-size mixed documents are stacked so as to contact the document guide, documents of some document sizes may not be fed because the documents cannot be stacked in a position where a document can be fed by the feed roller of the ADF (FIG. 4B). In this case, the documents should be stacked in the position where a document can be fed by the feed roller, for example, in the center position of the document tray (FIG. 4C).

In this case, since the documents cannot be stacked so as to contact the document guide, the skew tends to occur (FIG. 4D) and there is a high possibility that the documents are restacked after once stacking on the document tray (what is called replacement).

In the ADF of JP 2005-263452A, since the document tray is lifted up when documents are once stacked thereon and the feed roller grips the documents in the lift-up position, a user is difficult to restack the documents (FIG. 5).

Restacking documents may be addressed by switching the timing of lift-up of the document tray according to an instruction from a document reading application. Specifically, an application for reading standard-size mixed documents automatically lifts up the document tray at the timing when the documents are stacked on the document tray, and an application for reading nonstandard-size mixed documents lifts up the document tray at the timing of execution of a job. Since the lifting of the document tray is preparation of the reading process, the lifting is preferably controlled in a state where a user waits for execution of an application (when the application is selected) before reading in order to improve reading speed.

In the meantime, various applications are installed in an image forming apparatus. When the lifting of the document tray is controlled by an instruction from an application, and when another application is selected owing to a user's operation mistake, the document tray may be unnecessarily lifted and lowered. Such unnecessary lifting and lowering of the document tray may shorten a life of a concerning component, such as a motor.

SUMMARY

Various embodiments of the present disclosure provide a reading apparatus, a control method for the reading apparatus, and a storage medium storing a control program for the reading apparatus, which can prolong a life of a component concerning lifting and lowering of a document tray.

According to an aspect of the present disclosure, a reading apparatus to convey a document set on a document tray and to read an image of the conveyed document includes a control unit configured to perform lifting control for lifting the document tray in a case where a first condition is satisfied and to perform lowering control for lowering the document tray in a case where a second condition is satisfied, and a determining unit configured to determine whether a predetermined period elapses after the lifting control of previous time is started, wherein the control unit does not perform the lowering control even if the second condition is satisfied in a case where the determining unit determines that the predetermined period does not elapse.

Further features of the present disclosure will become apparent from the following description of exemplary embodiments with reference to the attached drawings.

DESCRIPTION OF THE EMBODIMENTS

Figure 1:
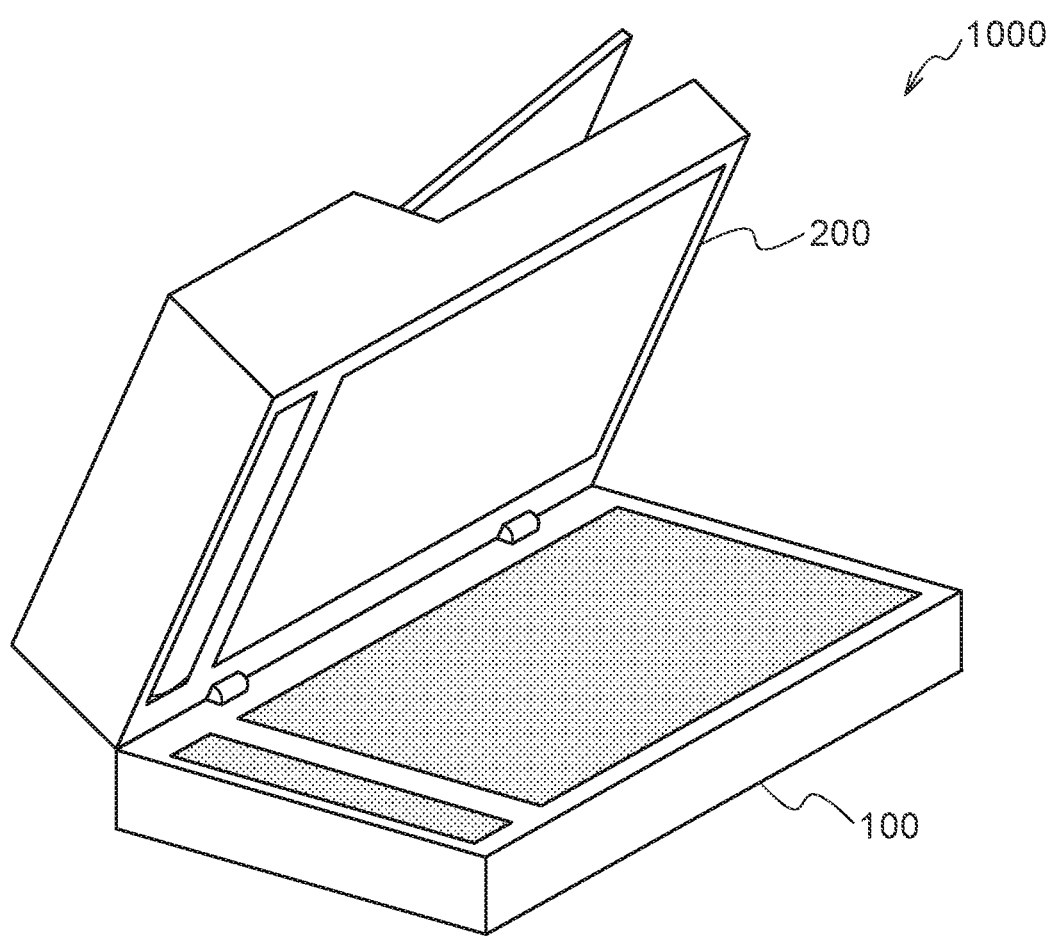
FIG. 1 is a perspective view showing a document reading apparatus according to a first embodiment.

Hereafter, embodiments according to the present disclosure will be described in detail by referring to the drawings.

FIG. 1 is a perspective view showing a document reading apparatus 1000 according to a first embodiment. As shown in FIG. 1, the document reading apparatus 1000 consist of a document reading unit 100 that reads a document and an automatic document feeder (hereinafter, referred to as an ADF) 200 that conveys a document toward the document reading unit 100.

The document reading apparatus 1000 is controlled as a whole by a reader controller 300 and a system controller 400 that are mentions later by referring to FIG. 3. The ADF 200 is connected to the document reading unit 100 via an opening-closing hinge provided on an upper-back side of the document reading unit 100 so as to open and to close freely.

The document reading unit 100 will be described by referring to FIG. 2 that is a sectional view of the document reading apparatus 1000. The document reading unit 100 has a platen glass 101, a front-side flow reading glass 102, a front-side reader 105, a scanning motor 306 (see FIG. 3) and a reading movement guide (not shown).

The front-side reader 105 is provided with front-side LEDs 103*a* and 103*b*, mirrors 104*a*, 104*b*, and 104*c*, and a front-side reading sensor 108.

Figure 2:
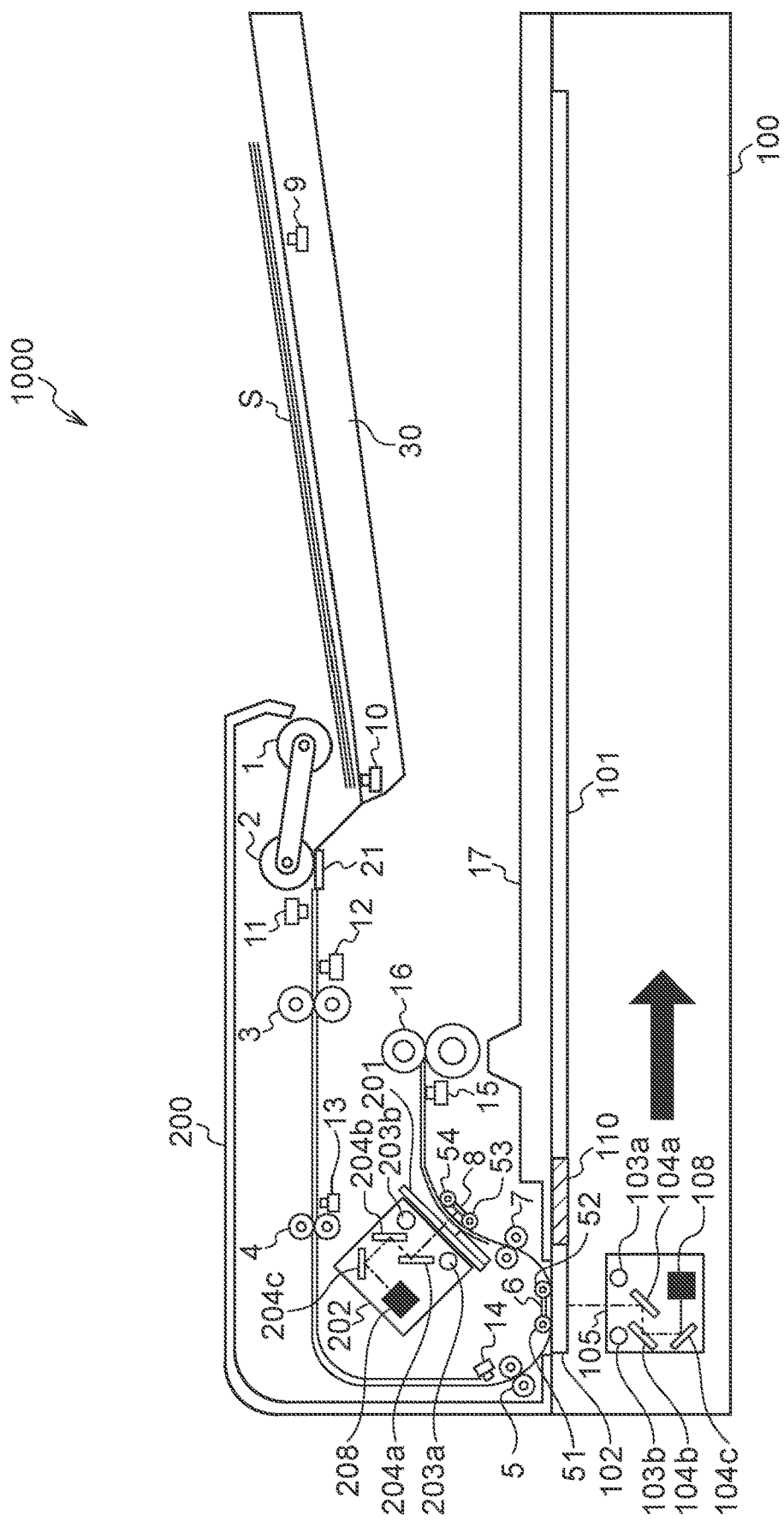
FIG. 2 is a sectional view showing the document reading apparatus of FIG. 1.

When reading a document placed on the platen glass 101, the document reading unit 100 reads the front side of the document with the front-side reader 105 line-by-line while moving the front-side reader 105 in a direction of an arrow in FIG. 2 along the reading movement guide with the scanning motor 306. Thereby, a read image of the front side of the document is generated.

Moreover, when reading a document stacked on a document tray 30, the document reading unit 100 reads the front side of the document conveyed by the ADF 200 to a front-side reading position between a front-side flow reading glass 102 and a front-side-glass opposite member 6 with the front-side reader 105 fixed at a position shown in FIG. 2. A reference portion 110 resides between the platen glass 101 and the front-side flow reading glass 102.

The ADF 200 will be described by referring to FIG. 2. The ADF 200 is provided with the document tray 30, a feed roller 1, a separation roller 2, a separation pad 21, a drawing roller pair 3, a conveying roller pair 4, an upstream reading roller pair 5, a front-side-reading upstream roller 51, a front-side-reading downstream roller 52, a downstream reading roller pair 7, a discharge roller pair 16, and a discharge tray 17. In addition, a separation sensor 11, a drawing sensor 12, a conveyance sensor 13, a reading sensor 14, and a discharge sensor 15 that are components of the ADF 200 will be mentioned later by referring to FIG. 3.

The document tray 30 is a stacking unit on which a document bundle S that consists of one or more sheets is stacked. The separation pad 21 and the separation roller 2, which are function as a separation mechanism, regulate projection of the document bundle S from the document tray 30 before starting conveyance of a document.

Moreover, the document tray 30 has a document presence sensor 10 that detects presence of a document on the document tray 30 and a document length sensor 9 for determining a document size of a document on the document tray 30.

Moreover, the ADF 200 is provided with a front-side-glass opposite member 6, a back-side flow reading glass 201, a back-side-glass opposite member 8, and a back-side reader 202. The front-side-reading upstream roller 51 and the front-side-reading downstream roller 52 are attached to the both ends of the front-side-glass opposite member 6. A back-side-reading upstream roller 53 and a back-side-reading downstream roller 54 are attached to the both ends of the back-side-glass opposite member 8.

The back-side reader 202 is provided with back-side LEDs 203*a* and 203*b*, mirrors 204*a*, 204*b*, and 204*c*, and a back-side reading sensor 208.

When a document is conveyed to read, the feed roller 1 needs to contact the document bundle S with proper pressure in order to convey a document stacked on the document tray 30 certainly. As a means for that, the document tray 30 is lifted up to a predetermined height so that the feed roller 1 will be in pressure contact with the top face of the document bundle S stacked on the document tray 30. The uppermost document of the document bundle S is conveyed by rotating the feed roller 1 in this state. If a plurality of documents are conveyed by the feed roller 1, the upmost document is separated and conveyed by effects of the separation pad 21 and the separation roller 2. This separation is achievable by a well-known separation technology.

The upmost document that may be separated by the separation pad 21 and the separation roller 2 is conveyed to the drawing roller pair 3.

Furthermore, the document is conveyed by the drawing roller pair 3 to the conveying roller pair 4. A conveyance path along which the document passed through the conveying roller pair 4 is conveyed is arranged at the downstream side of the conveying roller pair 4. The document sent to the conveyance path is conveyed by the upstream reading roller pair 5 and the front-side-reading upstream roller 51 to the front-side reading position.

One-side flow reading of a document in the document reading apparatus 1000 is performed as follows. The front side of the document that is conveyed to the front-side reading position is irradiated by the front-side LEDs 103*a* and 103*b* while passing through a space between the front-side flow reading glass 102 and the front-side-glass opposite member 6. Reflected light from the document is reflected by the mirrors 104*a*, 104*b*, and 104*c*, and is received by the front-side reading sensor 108. Thereby, the front-side reader 105 reads the front side image of the document line by line at the front-side reading position (front-side reading).

The document of which the front side image has been read by the front-side reader 105 is ejected to the discharge tray 17 by the downstream reading roller pair 7 and discharge roller pair 16 that are positioned between the front-side reader 105 and back-side reader 202.

When there are two or more documents on the document tray 30, the feeding from the document bundle S, the separation, the conveyance, the one-side reading at the front-side reading position, and the discharge are repeated until the last document is read and is discharged to the discharge tray 17.

Two-side flow reading of a document in the document reading apparatus 1000 is obtained by adding a reading operation of a back side of a document to the reading of a front side of a document in the one-side flow reading. Since the feeding, separation, conveyance, and front-side reading of a document are the same as that of the above-mentioned one-side reading, their descriptions are omitted.

The document conveyed by the front-side-reading downstream roller 52 is conveyed to a back-side reading position by the downstream reading roller pair 7 and back-side-reading upstream roller 53. The back-side flow reading glass 201, which is constituted movable, is set at a position shown in FIG. 2 before the document reaches the back-side reading position.

The back side of the document that is conveyed to the back-side reading position is irradiated by the front-side LEDs 203*a* and 203*b* while passing through a space between the back-side flow reading glass 201 and the back-side-glass opposite member 8. Reflected light from the document is reflected by the mirrors 204*a*, 204*b*, and 204*c*, and is received by the back-side reading sensor 208. Thereby, the back-side reader 202 reads the back side image of the document line by line at the back-side reading position (back-side reading).

The document is conveyed to the discharge tray 17 by the back-side-reading downstream roller 54 and the discharge roller pair 16 after the back-side reader 202 reads the back side image.

When there are two or more documents on the document tray 30, the feeding from the document bundle S, the separation, the conveyance, the front-side reading at the front-side reading position, the back-side reading at the back-side reading position, and the discharge are repeated until the last document is read and is discharged to the discharge tray 17.

In this embodiment, although the front-side reading sensor 108 of the front-side reader 105 and the back-side reading sensor 208 of the back-side reader 202 are constituted by CCDs, they are not limited to the CCDs. For example, the front-side reading sensor 108 and the back-side reading sensor 208 may be constituted by CIS sensors etc.

Figure 3:
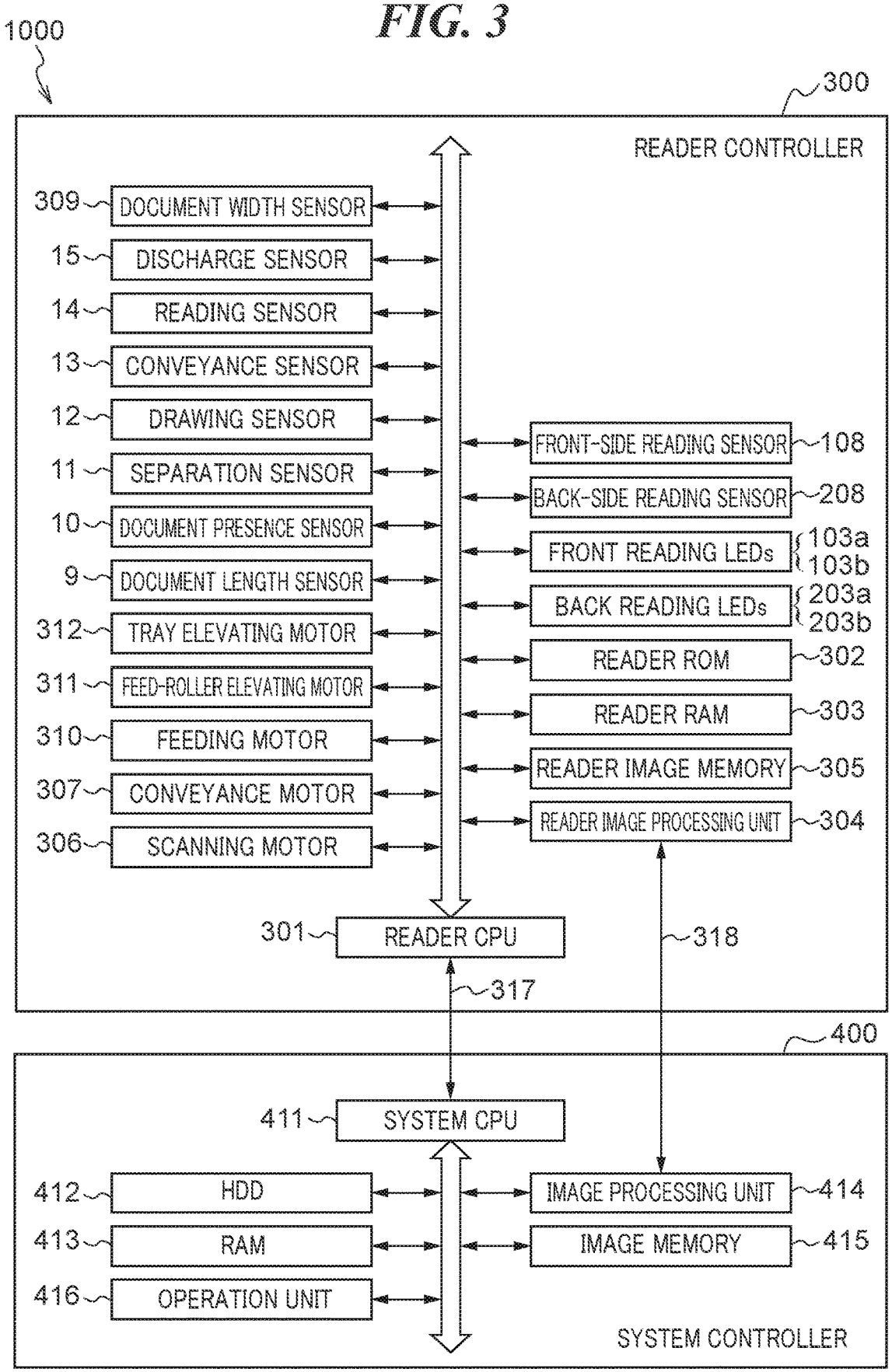
FIG. 3 is a block diagram showing configuration examples of a reader controller and a system controller of the document reading apparatus of FIG. 1.

FIG. 3 is a block diagram showing configuration examples of the reader controller 300 and the system controller 400 of the document reading apparatus 1000. The reader controller 300 and the system controller 400 are mutually connected through a command data bus 317 and an image data bus 318.

The reader controller 300 is provided with a reader CPU 301, reader leader-ROM 302, reader RAM 303, reader image processing unit 304, and reader image memory 305. Moreover, the reader controller 300 is provided with the scanning motor 306, a conveyance motor 307, a document width sensor 309, a feeding motor 310, a feed-roller elevating motor 311, and a tray elevating motor 312. The feed-roller elevating motor 311 is used to lift and lower the feed roller 1. The tray elevating motor 312 is used to lift and lower the document tray 30.

Furthermore, the reader controller 300 is provided with a part of the components shown in FIG. 2. Specifically, the reader controller 300 is provided with the front-side LEDs 103*a* and 103*b*, back-side LEDs 203*a* and 203*b*, front-side reading sensor 108, back-side reading sensor 208, document length sensor 9, document presence sensor 10, separation sensor 11, drawing sensor 12, conveyance sensor 13, reading sensor 14, and discharge sensor 15. These components of the reader controller 300 are mutually connected through a bus.

The reader CPU 301 is a central processing unit that controls the document reading unit 100 by running a program that is shown by a flowchart of FIG. 11 mentioned later and is stored in the reader ROM 302.

The reader ROM 302 is a read-only memory in which a control program is stored. The reader RAM 303 is a random access memory in which input data and working data are stored.

The feeding motor 310 and conveyance motor 307 drive rollers for conveyance in order to achieve a document conveyance function. When the feeding motor 310 drives, the feed roller 1 and separation roller 2 that are connected to the feeding motor 310 rotate. Moreover, the other rollers for conveyance (the drawing roller pair 3, conveying roller pair 4, upstream reading roller pair 5, downstream reading roller pair 7, and discharge roller pair 16) are connected to the conveyance motor 307 and rotate in interlock with rotation of the conveyance motor 307.

In this embodiment, the feeding motor 310 and conveyance motor 307 are pulse motors. The reader CPU 301 manages a rotation amount of each motor by controlling the number of driving pulses. Accordingly, the number of pulses can be regarded as conveyance distance of the document under conveyance. The reader CPU 301 can measure the conveyance distance of the document by counting the numbers of driving pulses of the sheet feeding motor 310 and conveyance motor 307.

The separation sensor 11, drawing sensor 12, conveyance sensor 13, reading sensor 14, and discharge sensor 15 are conveyance-system sensors provided in various places of the conveyance path.

The document length sensor 9 is provided on the document tray 30 and detects length of documents stacked on the document tray 30.

The document width sensor 309 is provided on the document tray 30 and detects width of documents stacked on the document tray 30. In this embodiment, size of documents stacked on the document tray 30 is predicted using outputs from the document length sensor 9 and document width sensor 309.

When documents are stacked on the document tray 30, the reader CPU 301 operates the feed-roller elevating motor 311 connected with a feed-roller elevating mechanism to lower the feed roller 1 (FIG. 2). After that, the reader CPU 301 operates the tray elevating motor 312 connected with an elevating mechanism for elevating the document tray 30 to lift the document tray 30.

The reader CPU 301 stops the tray elevating motor 312 when the document tray 30 is lifted to a feeding position where the lowered feed roller 1 contacts the documents stacked on the document tray 30. Then, the reader CPU 301 operates the feeding motor 310 to drive the feed roller 1 so that a document will be fed into the body of the ADF 200.

In order to achieve of an image reading function, the front-side LEDs 103a and 103b, back-side LEDs 203a and 203b, front-side reading sensor 108, and back-side reading sensor 208 are connected to the reader CPU 301. The reader CPU 301 applies various image processes to image data read by the front-side reading sensor 108 and back-side reading sensor 208 with the reader image processing unit 304, and then stores the processed image data into the reader image memory 305. The reader CPU 301 receives an image output request from a system CPU 411 (mentioned later) of the system controller 400 through the command data bus 317. Moreover, when receiving the image output request, the reader CPU 301 transmits the image data stored in the reader image memory 305 to an image processing unit 414 (mentioned later) of the system controller 400 through the image data bus 318. Furthermore, the reader CPU 301 notifies the system controller 400 of a vertical synchronizing signal used as a criterion of the tip of the document image data and a horizontal synchronization signal used as a criterion of a head pixel of one line in accordance with a document reading timing through the image data bus 318.

The system controller 400 is provided with the system CPU 411, an HDD 412, a RAM 413, the image processing unit 414, an image memory 415, and an operation unit 416 that are mutually connected through a bus.

The system CPU 411 is connected with the reader CPU 301 through the command data bus 317 and transmits and receives data about image reading control.

The image processing unit 414 receives the image data processed by the reader image processing unit 304 from the reader image processing unit 304 through the image data bus 318, applies predetermined image processes, such as a color correction, to the received image data, and then, stores the image data into the image memory 415.

The operation unit 416 is an interface with a user and is controlled by the system CPU 411. The HDD 412 stores applications as software that apply a document reading process, a business-form process, etc. to a read document.

The system CPU 411 reads the application stored in the HDD 412 if needed, develops it to the RAM 413, and executes it.

That is, in this embodiment, an instruction to execute the document reading process, an instruction of a preliminary operation accompanying it, and a user interface displayed on the operation unit 416 are controlled by a system control application running on the system CPU 411.

Next, a reading method of a case where documents of different document sizes are stacked by mixture will be described.

The reader CPU 301 feeds and conveys documents stacked on the document tray 30 to the conveyance path in the ADF 200 one by one by using the feed roller 1 and separation roller 2 as with the reading methods (one-side flow reading and two-side flow reading) mentioned above.

At this time, the length of the document conveyed is detected using the separation sensor 11. Namely, documents are fed by the feed roller 1 from the document bundle S on the document tray 30 and its upmost one is separated and conveyed by the separation roller 2 and separation pad 21. When the leading edge of the conveyed document passes the separation sensor 11, the separation sensor 11 turns ON. After that, when the document is conveyed within the ADF 200 as-is and the trailing edge of the document passes the separation sensor 11, the separation sensor 11 turns OFF. A period from the time point when the separation sensor 11 turns ON to the time point when the separation sensor 11 turns OFF is measured, and the length of the document is measured by multiplying the measured period by a conveyance speed. This technique is generally used as a well-known technique.

Then, the document is conveyed to the front-side reading position, and the front side image of the document is read by the front-side reader 105. After that, the reader image processing unit 304 detects edges in the width direction of the document from the front side image of the read document and measures the width of the document from the detected edges. The size of the document is specified on the basis of the measured width and length of the document. A read image of the specified size is extracted from the image data and is stored into the reader image memory 305.

The document tray 30 is connected to the tray elevating motor 312 through a gear train. The document tray 30 is lifted and lowered by driving the tray elevating motor 312.

Figure 6:
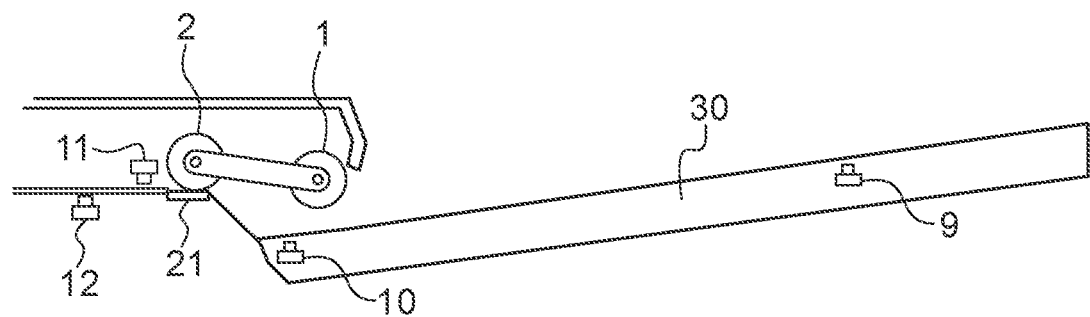
FIG. 6 is a sectional view showing the automatic document feeder of a case where the document tray is in a standby position.
Figure 7:
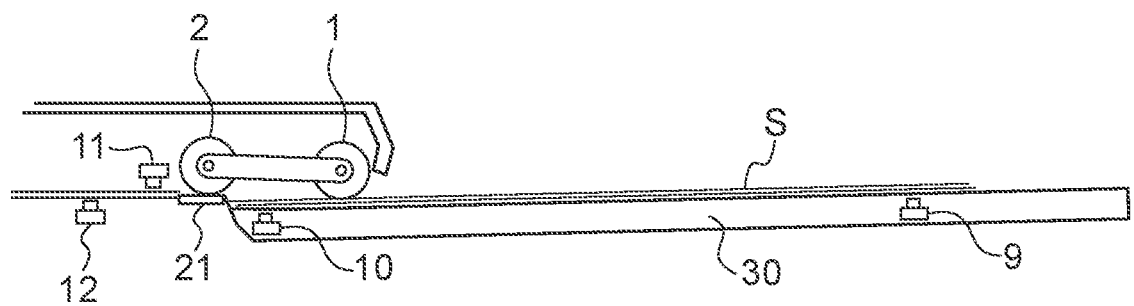
FIG. 7 is a sectional view showing the automatic document feeder of a case where the document tray is in a feeding position.

When not reading a document, the document tray 30 is waiting at a lowered standby position (FIG. 6). When the document bundle S is set on the document tray 30 and the reader CPU 301 determines that there are documents on the basis of the output from the document presence sensor 10, the feed roller 1 is lowered and the document tray 30 on which documents are stacked is lifted in order to feed the documents. After that, the lifting of the document tray 30 is stopped at a feeding position where the lowered feed roller 1 can contact the document bundle S. Since the feed roller 1 is contacting the document bundle S when the document tray 30 is lifted and stopped, a document can be fed immediately by driving the feed roller 1, which enables to start reading quickly (FIG. 7).

Figure 4A:
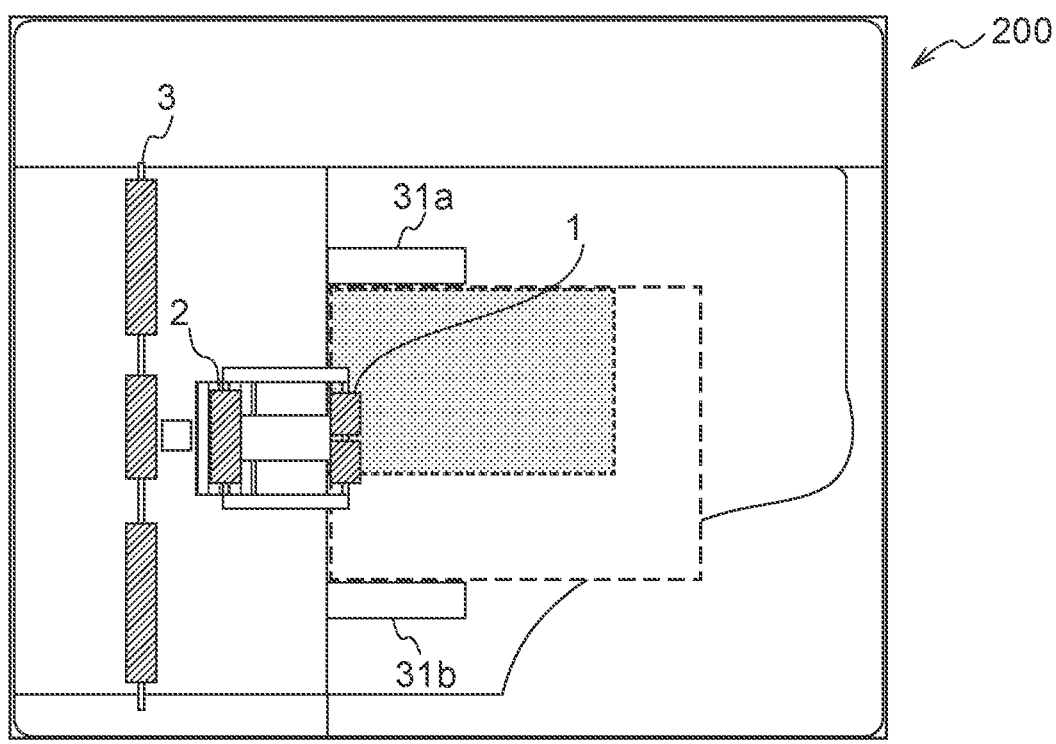
FIG. 4A is a top view showing an automatic document feeder of a case where standard-size documents are set on a document tray so as to contact a document guide.

Document guides 31a and 31b are installed on the document tray 30 to set documents at a proper position (center position) (FIG. 4A). The document guides 31a and 31b can be manually moved in accordance with width of documents. The reader CPU 301 detects a distance between the document guides 31a and 31b detected by the document width sensor 309 as a width size of the documents. When the documents to be read by the document reading apparatus 1000 have the same size (one size), the reader CPU 301 uses the width size information detected in this place.

In the meantime, since documents of different sizes are stacked on the document tray 30 in a case of reading mixed documents, the documents are stacked so as to contact at least one of the document guide 31a and document guide 31b provided on the document tray 30 in order to prevent a document from being conveyed aslant (what is called skew) during feed conveyance. Thereby, the documents on the document tray 30 are conveyed one by one with the feed roller 1 without skew (FIG. 4A), and each document is read by the document reading unit 100.

Figure 4B:
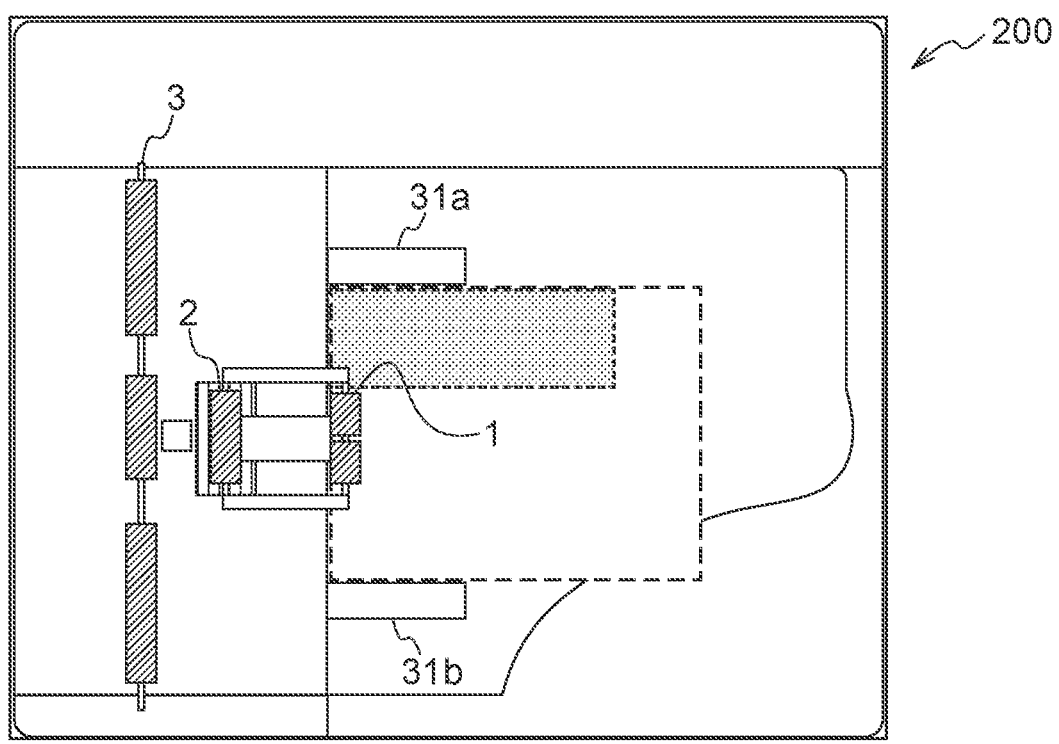
FIG. 4B is a top view showing the automatic document feeder of a case where nonstandard-size documents are set on the document tray so as to contact the document guide.

The above-mentioned method is effective to documents of the sizes defined by the standard as mentioned above. However, when nonstandard-size documents (receipts, checks, or business forms) are stacked by mixture on the document tray 30 by the above-mentioned method, documents of some document sizes may not be fed because the documents may not be stacked in a position where a document can be fed by the feed roller 1 (FIG. 4B).

Figure 4C:
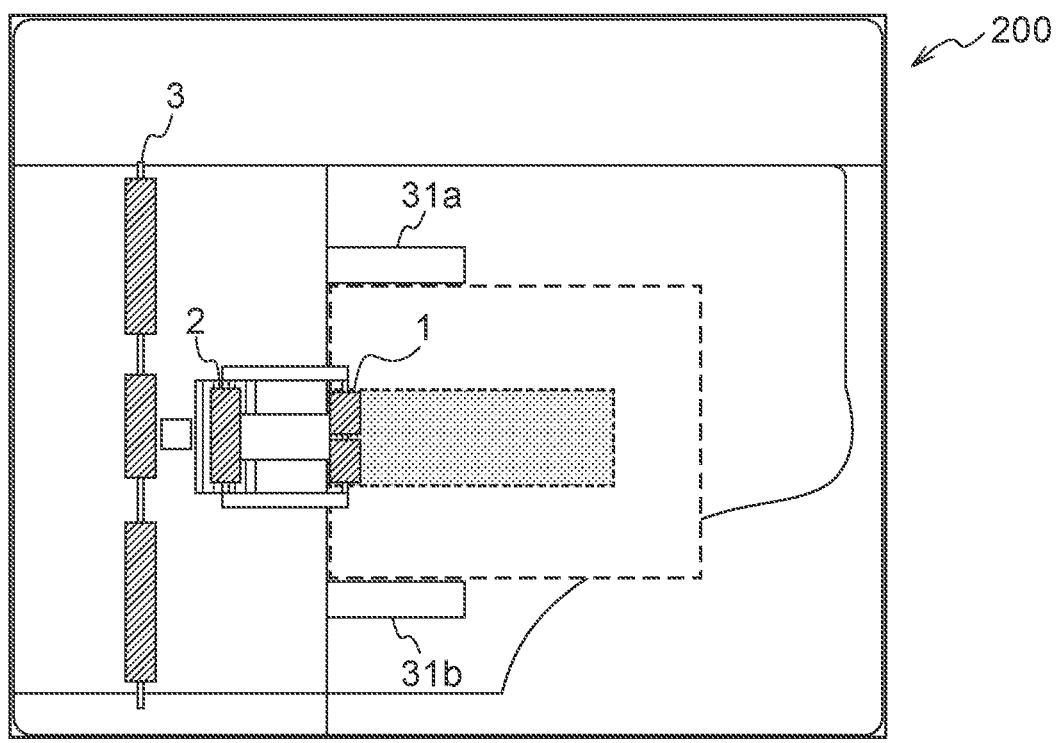
FIG. 4C is a top view showing the automatic document feeder of a case where nonstandard-size documents are set on the document tray so as to match a position of a feed roller.

Accordingly, when nonstandard-size documents are stacked by mixture, it is necessary to notify a user so as to stack the documents in the position where a document can be fed by the feed roller 1 as shown in FIG. 4C.

Figure 4D:
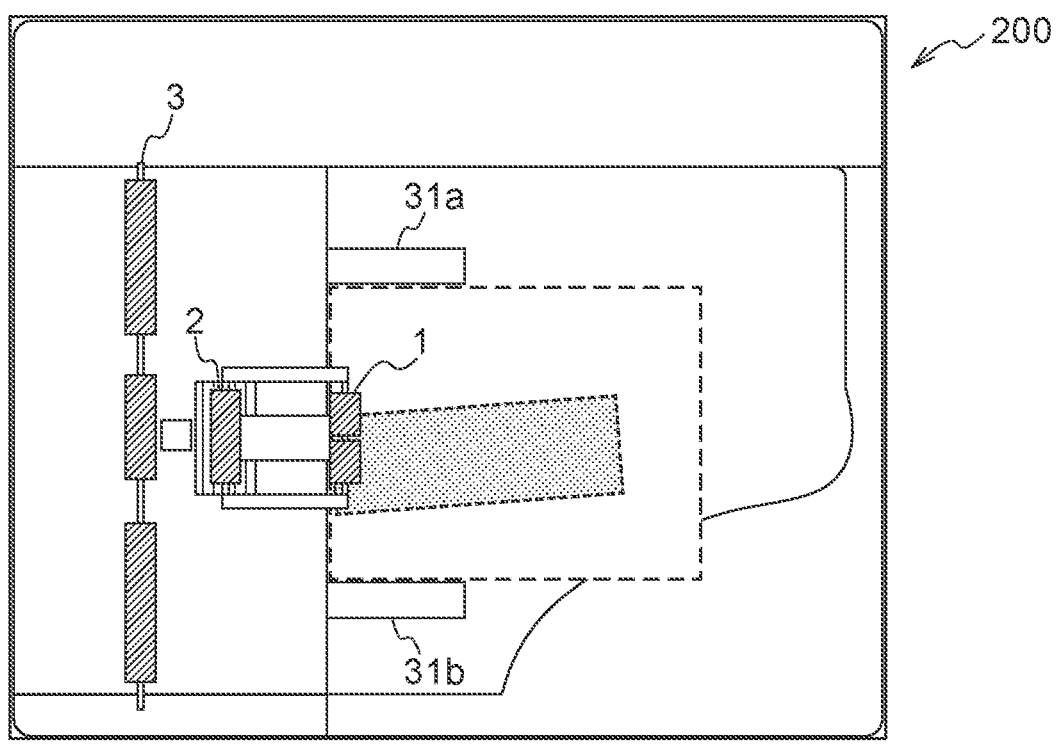
FIG. 4D is a top view showing the automatic document feeder of a case where documents are set aslant on the document tray so as to match the position of the feed roller.

In the meantime, when the user stacks the documents in response to this notification, some documents may contact neither of the document guides 31a and 31b, which may cause the skew as a result as shown in FIG. 4D. In this case, the user has to restack the documents after once stacking the documents on the document tray. That is, what is called replacement becomes necessary.

Figure 5:
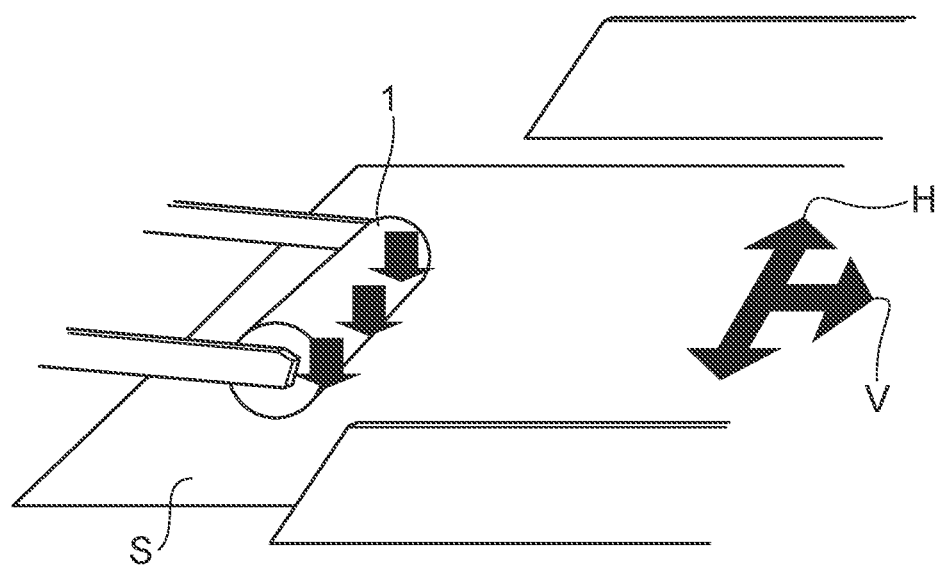
FIG. 5 is a perspective view of the automatic document feeder showing a state where it is difficult to replace the documents.

In the case of the conventional ADF, since the document tray 30 on which the document bundle S has been already stacked is lifted and stopped at a time point when a user wants to replace the documents, the document bundle S is in a state where pressure is applied by the feed roller 1 (FIG. 5). In such a state, it is hard to correct the position of the documents in a document conveyance direction (a sub scanning direction V) and an orthogonal direction (a main scanning direction H), and it is difficult to replace the documents.

When the user performs a switch operation of a running application (an application under execution) to once finish reading the documents, the replacement of the documents becomes easy because the document tray 30 is lowered. However, when this switch operation is performed, the document tray 30 is lowered immediately after being lifted, which increases loads of the tray elevating motor 312 and the feed-roller elevating motor 311 that operates in interlock with it.

Consequently, in this embodiment, when nonstandard-size mixed documents are read, the tray elevating motor 312 is controlled so as to restrain the lifting and lowering operations of the document tray 30 until a prescribed period elapses after the documents are stacked on the document tray 30. This prevents the load of the tray elevating motor 312 from increasing. Hereinafter, the control at the time of reading nonstandard-size mixed documents will be specifically described.

Figure 8:
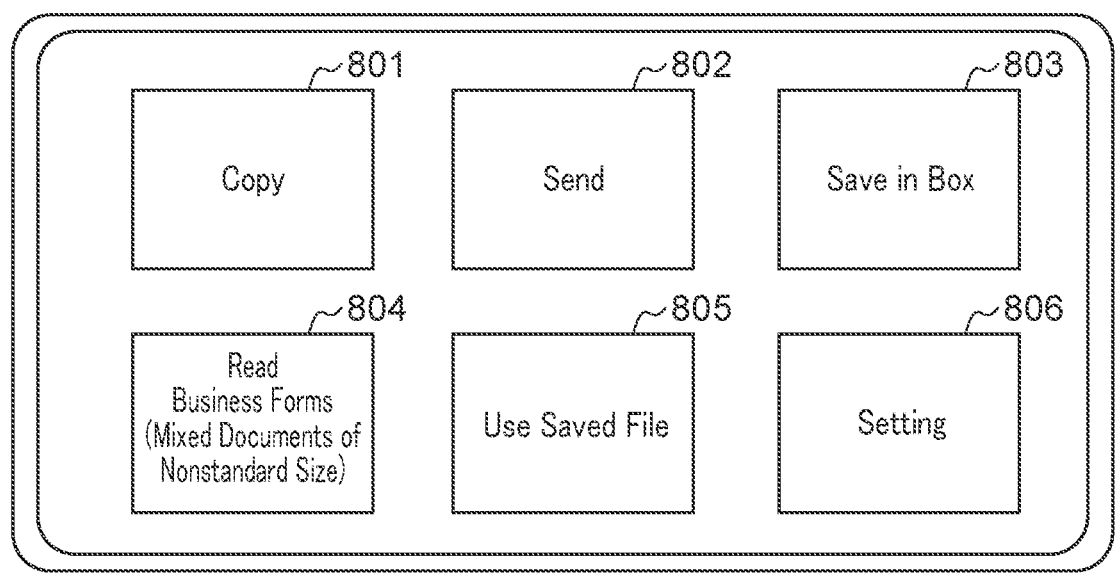
FIG. 8 is a view showing a HOME screen displayed on an operation unit in FIG. 3.

The reading of the nonstandard-size mixed documents in this embodiment will be described using FIG. 8 through FIG. 11. FIG. 8 is a view showing a home screen that is displayed on the operation unit 416 when a reading operation is not performed after starting the power source of the document reading apparatus 1000. A copy button 801, send button 802, the save-in-box button 803, read-business-form button 804, use-saved-file button 805, and setting button 806 shown in FIG. 8 can be selectable by touching the home screen.

When the business-form reading button 804 on the home screen is selected by a user's operation to the operation unit 416, a business-form reading application (a nonstandard-size mixed documents reading application) to read nonstandard-size mixed documents is started in the document reading apparatus 1000. After starting, the business-form reading application instructs the system control application to perform the preliminary operation. When receiving the instruction of the preliminary operation, the systems control application displays a business-form read setting screen 900 shown in FIG. 9 on the operation unit 416 to notify a user to set documents in the center and lowers the document tray 30 after a prescribed period mentioned later elapses. Moreover, the user can select detailed read settings that the user desires by using the business-form read setting screen 900 shown in FIG. 9. When the user selects a start key in the business-form read setting screen 900 after that, the business-form reading application instructs the system control application to read documents. When receiving the instruction, the system control application instructs a reader control application to lift the document tray 30. After that, when the system control application is notified of a control event of lifting end, the system control application starts feeding and reading of the documents on the document tray 30. After that, when the system control application is notified of a control event showing that there is no document on the document tray 30 from the reader controller 300, the system control application returns the display on the operation unit 416 to the home screen. Moreover, at this occasion, the reader control application lowers the document tray 30 to the standby position (a lowering end position).

Figure 10:
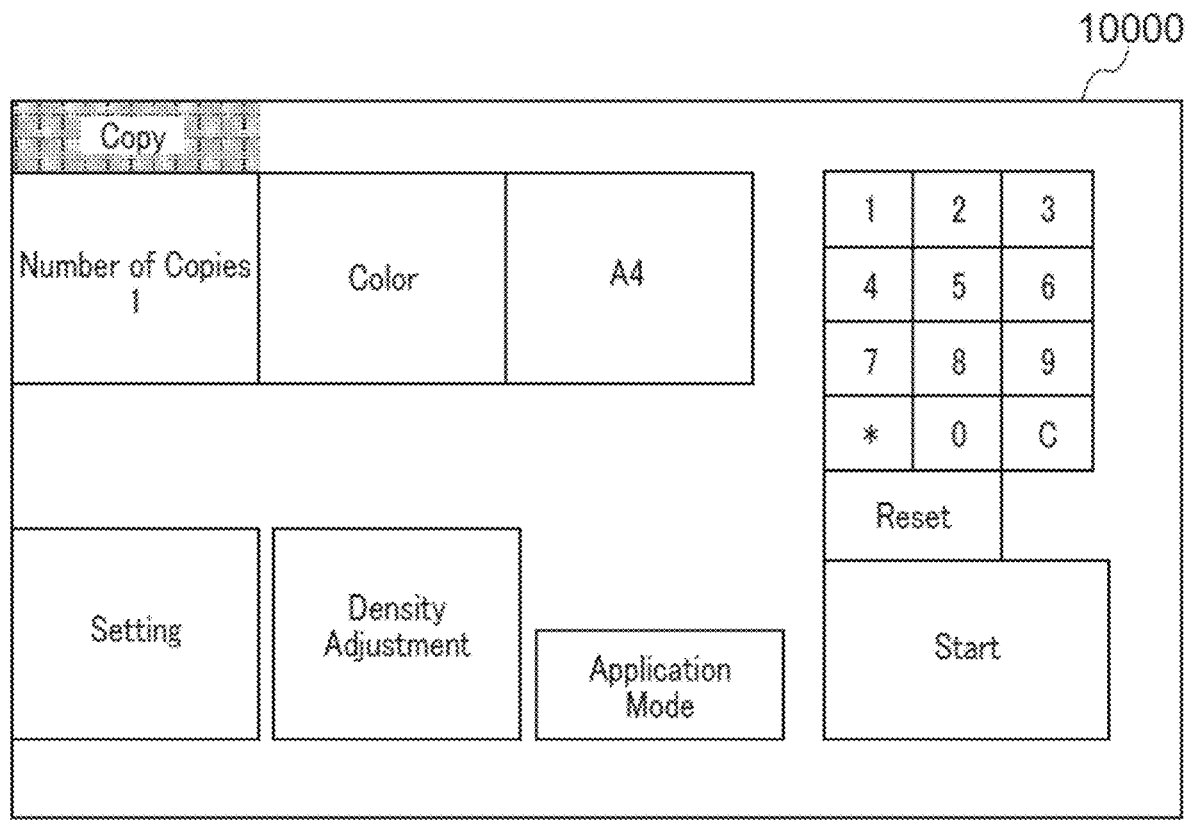
FIG. 10 is a view showing a copy setting screen displayed on the operation unit during start-up of a copy application for reading standard-size documents.

FIG. 10 is a copy setting screen 10000 displayed on the operation unit 416 when the copy button 801 is selected.

When the copy button 801 on the home screen is selected by a user's operation to the operation unit 416, a copy application, which is one of standard-size document reading applications that execute reading processes of standard-size documents, is started. After starting, the copy application instructs the system control application to perform the preliminary operation. When receiving the instruction of the preliminary operation, the system control application displays a copy setting screen shown in FIG. 10 on the operation unit 416 and lifts the document tray 30 after the prescribed period mentioned later elapses. Moreover, the user can select detailed read settings that the user desires by using the copy setting screen shown in FIG. 10. When the user selects a start key in the copy setting screen after that, the copy application instructs the system control application to read documents. When receiving the instruction, the system control application instructs a reader control application to lift the document tray 30. After that, when the system control application is notified of a control event of lifting end, the system control application starts feeding and reading of the documents on the document tray 30. After that, when the system control application is notified of a control event showing that there is no document on the document tray 30 from the reader controller 300, the system control application returns the display on the operation unit 416 to the home screen. At this occasion, the reader control application lowers the document tray 30 to the standby position.

Although the copy application aims to read standard-size documents and not to read nonstandard-size mixed documents in this embodiment, the copy application may aim to read nonstandard-size mixed documents. Moreover, although this embodiment describes the case where a running application is switched to either the copy application or the business-form reading application in response to a user's selection of a button on the home screen, the present disclosure is not limited to this case. In addition to such applications, there may be other applications that execute reading jobs, such as an image sending process and a save-in-box process that are respectively started by selecting the send button 802 and the save-in-box button 803 on the home screen of FIG. 8, for example. Moreover, there may be an application that executes both a reading job for nonstandard-size mixed documents and a reading job for standard-size mixed documents.

Moreover, switching of a running application by a user is performed as follows in this embodiment. First, when a user presses a home button (not shown) provided on the operation unit 416 in a state where one of the business-form read setting screen of FIG. 9 and the copy setting screen of FIG. 10 is displayed, the home screen of FIG. 8 is displayed on the operation unit 416. The user can switch a running application by selecting either the copy button 801 or the business-form reading button 804 on the home screen so as to display the other of the business-form read setting screen and the copy setting screen.

The present disclosure is not limited to the configuration of this embodiment as long as one of the business-form read setting screen and the copy setting screen is displayed on the operation unit 416 so as to be switchable by a user. For example, a tab that switches between the business-form read setting screen and the copy setting screen may be provided in an upper portion of each of the screens. Thereby, the user can easily switch one of the business-form read setting screen and the copy setting screen that is currently displayed to the other screen by pressing the tab in the currently displayed screen.

Figure 9:
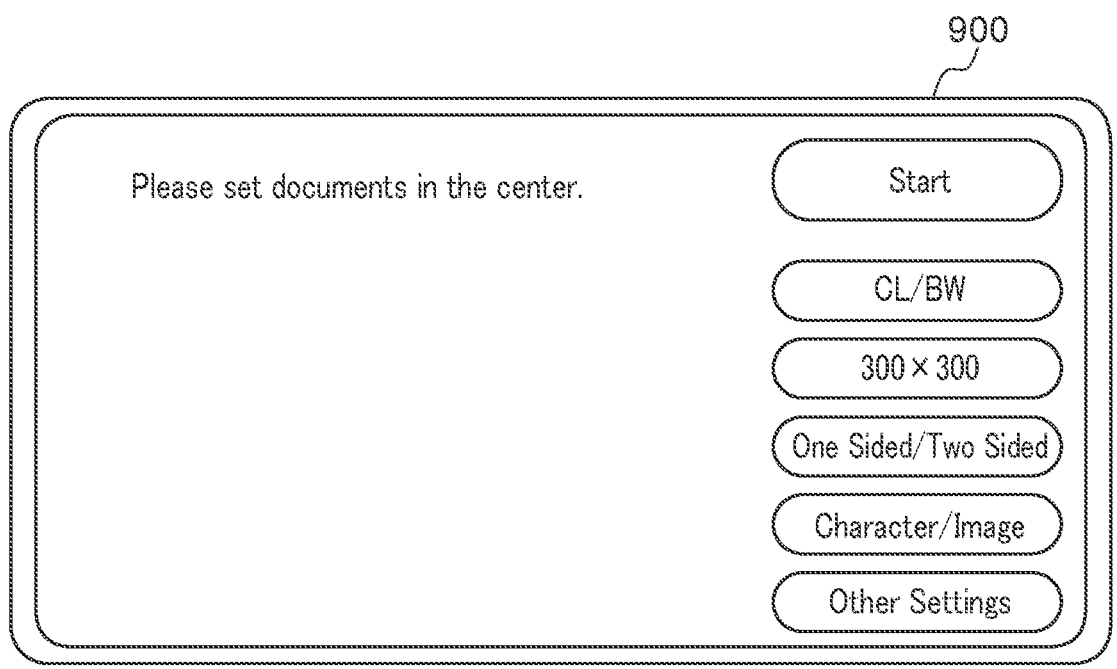
FIG. 9 is a view showing a business-form read setting screen displayed on the operation unit during start-up of a business-form reading application for reading nonstandard-size mixed documents.

Moreover, a tab that switches the display to the copy setting screen may be provided in a setting screen that is displayed when the user selects another setting key in the business-form read setting screen of FIG. 9.

Next, a document-tray elevation control process in this embodiment when documents are stacked on the document tray 30 will be described in detail using a flowchart of FIG. 11. This process is started when a running application is switched because a user switches a screen displayed on the operation unit 416 according to the above-mentioned method. Specifically, this process is started when a user selects one of the copy button 801 and the business-form reading button 804 on the home screen of FIG. 8 in a state where the document presence sensor 10 detects documents on the document tray 30.

In this embodiment, lifting control and lowering control for the document tray 30 are achieved by issuing a lifting command and a lowering command to the reader control application running on the reader CPU 301 from the system control application running on the system CPU 411. It should be noted that the system control application may notify the reader control application of a type of a document reading application and read settings instead of issuing the lifting command and the lowering command. In this case, the reader control application controls elevation (lifting and lowering) of the document tray 30 suitably according to the notified contents.

Moreover, the reader controller 300 notifies the system control application of control events, such as a lifting event (during movement to the feed position), a lowering event (during movement to the standby position), a lifting end event, and a lowering end event. Moreover, the reader controller 300 notifies the system control application of control events, such as an event showing that documents are set on the document tray 30 and an event showing that documents are removed from the document tray 30.

Figure 11:
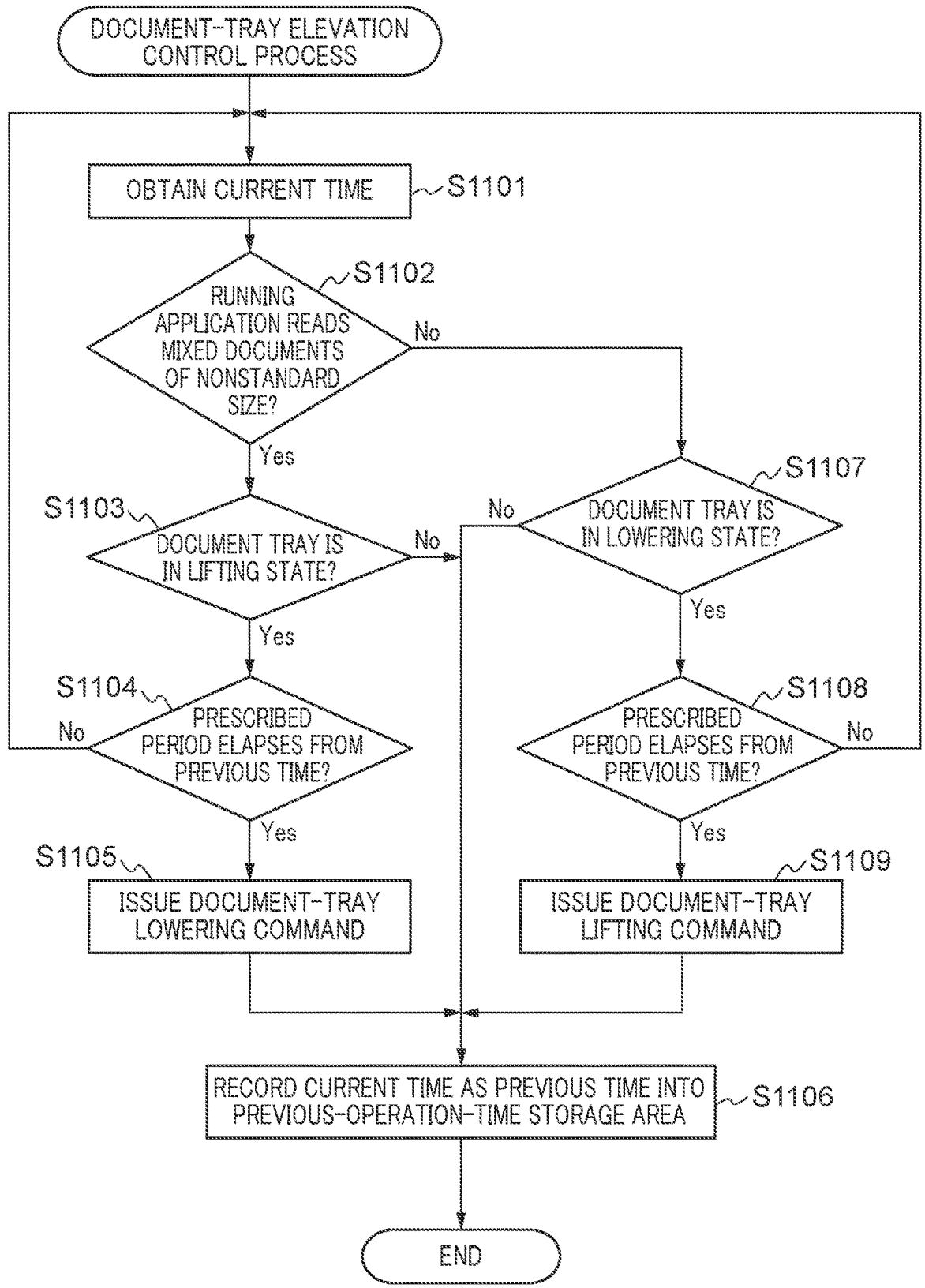
FIG. 11 is a flowchart showing a document-tray elevation control process in the first embodiment.

FIG. 11 is a flowchart showing a document-tray elevation control process in the first embodiment.

The system control application obtains current time in a step S1101 first.

Next, the system control application determines whether the running application reads nonstandard-size mixed documents in a step S1102. As a result of the determination, when the running application reads nonstandard-size mixed documents, the process proceeds to a step S1103.

In the step S1103, the system control application determines whether the document tray 30 is in a lifting state. When the document tray 30 is not in the lifting state (NO in the step S1103), the process proceeds to a step S1106. When it is in the lifting state (YES in the step S1103), the process proceeds to a step S1104. The lifting state means a state where the reader controller 300 notifies the system control application of the control event showing that the document tray 30 is lifting or has been lifted.

In the step S1104, the system control application determines whether the prescribed period elapses from the previous lowering operation of the document tray 30. Specifically, the system control application determines whether the prescribed period elapses by comparing previous operation time that is stored in a previous-operation-time storage area secured in the RAM 413 with the current time obtained in the step S1101.

Although the value of the prescribed period is beforehand stored in the system control application as a fixed value, it may be a variable value set up by a system administrator. Moreover, the prescribed period may be dynamically controlled according to a residual life time (a difference between a part life time and the number of operations) of the tray elevating motor 312. The shorter the residual life time is, the longer the prescribed period should be.

As a result of the step S1104, when the prescribed period does not elapse, the process returns to the step S1101 after keeping certain period. When the prescribed period elapses, the process proceeds to a step S1105.

In the step S1105, the system control application issues the lowering command for the document tray 30 to the reader controller 300. In response to the lowering command for the document tray 30, the reader control application controls the tray elevating motor 312 to lower the document tray 30 and controls the feed-roller elevating motor 311 to lift the feed roller 1.

After that, the system control application writes the current time obtained in the step S1101 into the previous-operation-time storage area in the RAM 413 as previous time used for next lifting or lowering control in a step S1106 and finishes this process.

In the meantime, when the system control application determines that the running application does not read nonstandard-size mixed documents in the step S1102, the process proceeds to a step S1107. Specifically, when the copy setting screen of FIG. 10 is being displayed on the operation unit 416, it is determined that the running application does not perform a reading operation of nonstandard-size mixed documents (performs a copy job).

In the step S1107, the system control application determines whether the document tray 30 is in a lowering state. When the document tray 30 is not in the lowering state (NO in the step S1107), the process proceeds to the step S1106. When it is in the lowering state (YES in the step S1107), the process proceeds to a step S1108. The lowering state means a state where the reader controller 300 notifies the system control application of the control event showing that the document tray 30 is lowering or has been lowered.

In the step S1108, the system control application determines whether the prescribed period elapses from the previous lifting operation of the document tray 30. Specifically, the system control application determines whether the prescribed period elapses by comparing previous operation time as with the step S1104 that is stored in a previous-operation-time storage area secured in the RAM 413 with the current time obtained in the step S1101. As a result of the step S1108, when the prescribed period does not elapse, the process returns to the step S1101 as with the step S1104. When the prescribed period elapses, the process proceeds to a step S1109.

The system control application issues the lifting command for the document tray 30 to the reader controller 300 in the step S1109, and the process proceeds to the step S1106 after that. In response to this lifting command, the reader control application controls the tray elevating motor 312 to lift the document tray 30 and controls the feed-roller elevating motor 311 to lower the feed roller 1.

The system control application writes the current time obtained in the step S1101 into the previous-operation-time storage area in the RAM 413 as previous time in the step S1106 and finishes this process.

When an interrupt operation that is a user's selection of the start key in the business-form read setting screen or the copy setting screen is performed, the process of the step that is currently performed is interrupted and the process proceeds to the step S1106.

According to this process, even if the user switches between the business-form read setting screen and the copy setting screen in a short period, the elevation operation of the document tray 30 corresponding to the switched screen is suspended until the prescribed period elapses.

For example, when the user presses the copy button 801 by mistake instead of the business-form reading button 804 on the home screen of FIG. 8, the copy application that does not read nonstandard-size mixed documents is started instead of the business-form reading application that reads nonstandard-size mixed documents. In such a case, it is estimated that the user operates so as to switch the copy setting screen that is currently displayed on the operation unit 416 to the business-form read setting screen in a short period. Furthermore, in such a case, the user may operate so as to switch the copy setting screen that is currently displayed on the operation unit 416 to the business-form read setting screen at a timing after elapsing the prescribed period. Since the process of the step S1109 has been already executed at the timing when the screen switching operation is performed, the document tray 30 is in the lifting state. In this case, it is estimated that the user repeats operations to switch between the business-form read setting screen and the copy setting screen many times in a short period to make the document tray 30 into the lowering state so as to restack the documents on the document tray 30 in accordance with the notification displayed in the business-form read setting screen.

Moreover, it is estimated that the user may switch the business-form read setting screen that is currently displayed to the copy setting screen in a short period. In this embodiment, the completion of the switching to the screen corresponding to the process that the user inherently wants to execute is waited and the lifting or lowering command corresponding to the screen is issued by suspending the elevation operation of the document tray 30 according to the switched screen until the prescribed period elapses. This enables to restrain unnecessary lifting and lowering operation of the document tray 30.

Next, the second embodiment will be described. In the first embodiment, the lifting and lowering of the document tray 30 are suspended until the prescribed period elapses after the switching between the copy setting screen and the business-form read setting screen. As compared with this, in this embodiment, an operation count value that is the number of lifting and lowering operations performed until a reading operation is performed is counted, and when the operation count value exceeds a prescribed count value, the lifting and lowering operations performed until a reading operation is performed are restrained. In the description, the operation count value means the total issuance count of the lifting commands and lowering commands for the document tray 30.

Since the hardware configuration and software configuration of the document reading apparatus 1000 according to this embodiment are the same as that of the first embodiment, the same reference numerals are applied to the same components and duplicated descriptions are omitted.

Hereinafter, a document-tray elevation control process in this embodiment when documents are stacked on the document tray 30 will be described in detail using a flowchart of FIG. 12. This process is started when a running application is switched because a user switches a screen displayed on the operation unit 416 according to the above-mentioned method as with the process of FIG. 11.

Figure 12:
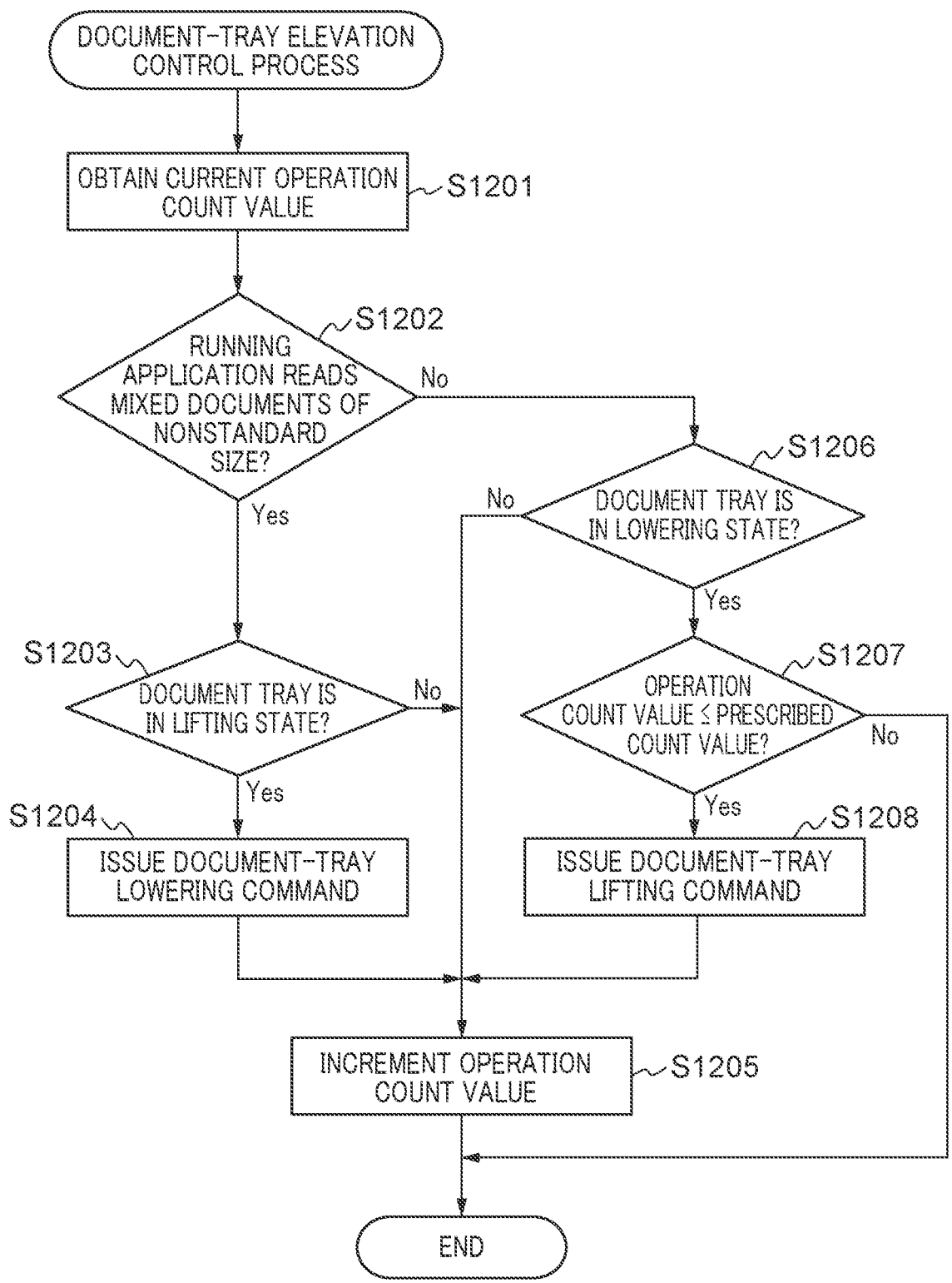
FIG. 12 is a flowchart showing a document-tray elevation control process of the in a second embodiment.

Since operations of the flowchart of FIG. 12 is basically similar to the operations of the flowchart of FIG. 11, only a different point is focused and is described in detail.

In a step S1201, the system control application obtains a current operation count value stored in an area secured in the RAM 413.

The operations in steps S1202, S1203, and S1206 are respectively identical to the operations in the steps S1102, S1103, and S1107. That is, when a running application reads nonstandard-size mixed documents, the process proceeds to the step S1203. Otherwise, the process proceeds to the step S1206.

In the step S1203, the system control application determines whether the document tray 30 is in the lifting state. When the document tray 30 is not in the lifting state (NO in the step S1203), the process proceeds to a step S1205. In the meantime, when the document tray 30 is in the lifting state (YES in the step S1203), the process proceeds to a step S1204 regardless of whether the current operation count value is equal to or less than the prescribed count value. In the step S1204, the system control application issues the lowering command for the document tray 30 to the reader controller 300. After that, the process proceeds to the step S1205.

In the step S1206, the system control application determines whether the document tray 30 is in the lowering state. When the document tray 30 is not in the lowering state (NO in the step S1206), the process proceeds to the step S1205. Otherwise in the lowering state, the process proceeds to a step S1207 and it is determined whether the current operation count value is equal to or less than the prescribed count value. When the current operation count value is equal to or less than the prescribed count value (YES in the step S1207), the process proceeds to a step S1208 and the system control application issues the lifting command for the document tray 30. After that, the process proceeds to the step S1205. In the meantime, when the current operation count value exceeds the prescribed count value (NO in the step S1207), the system control application finishes this process as-is without issuing the lifting command for the document tray 30.

In the step S1205, the system control application increments the current operation count value by one and finishes this process. Although the prescribed count value is beforehand stored in the system control application as a fixed value, it may be a variable value set up by a system administrator.

Moreover, in this embodiment, when the running application reads nonstandard-size mixed documents, the lowering command for the document tray 30 is issued only once so as to generate the lowering operation due to the operation of the tray elevating motor 312 regardless of whether the current operation count value is equal to or less than the prescribed count value. In the meantime, when the running application does not read nonstandard-size mixed documents, the lifting command for the document tray 30 is issued only when the current operation count value is equal to or less than the prescribed count value. This restrains the lifting operation of the document tray 30. Thereby, the lifting and lowering operations of the document tray 30 are restrained.

It should be noted that the current operation count value stored in the RAM 413 is reset to zero whenever the business-form reading application or the copy application instructs the system control application to read the documents. Accordingly, the lifting and lowering operations more than the prescribed count value for one reading operation can be restrained in this embodiment.

Moreover, in this embodiment, when receiving the instruction to read documents from the business-form reading application or the copy application, the system control application issues the lifting command for the document tray 30 to the reader controller 300 as with the first embodiment. After that, when receiving the control event of the lifting end from the reader controller 300, the system control application starts feeding and reading of the documents on the document tray 30.

The restraint of the lifting and lowering operations by the prescribed period is described in the first embodiment, and the restraint of the lifting and lowering operations by the prescribed count value is described in the second embodiment.

In the above-mentioned first and second embodiments, the system control application notifies the reader control application of the restraining control of the lifting and lowering operations of the document tray 30. However, the present disclosure is not limited to this. For example, the system control application may notify the reader control application to switch the running application, and the reader control application may control the restraint of the lifting and lowering operations of the document tray 30.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-125735, filed Jul. 22, 2020, which is hereby incorporated by reference herein in its entirety.

What is claimed is:

1. A reading apparatus to convey a document set on a document tray and to read an image of the conveyed document, the reading apparatus comprising:
   at least one processor that performs operations including:
   selecting one of a first function or a second function,
   performing lifting control for lifting the document tray in a case where the document is set on the document tray and the first function is selected and performing lowering control for lowering the document tray in a case where the document is set on the document tray and the second function is selected,
   obtaining time information, and
   judging, based on the obtained time information, whether a predetermined period elapses,
   wherein the lowering control is not performed based on judgment that the predetermined period does not elapse after performing lifting control of previous time even if a second condition is satisfied, and
   wherein the lowering control is performed based on judgment that the predetermined period elapses if the second condition is satisfied.

2. The reading apparatus according to claim 1, wherein the second condition is satisfied in a case where the document is set on the document tray and the second function is selected.

3. The reading apparatus according to claim 1, wherein the first function is a business-form reading function for reading a business form.

4. The reading apparatus according to claim 3, wherein the second function is a copy function that is different from the business-form reading function.

5. The reading apparatus according to claim 1,
   wherein the operations further include receiving input from a user to switch (i) from a first setting screen that is configured to cause a document tray lifting command to be issued or a document tray lowering command to be issued (ii) to a second setting screen that is configured to cause the document tray lifting command to be issued or the document tray lowering command to be issued, and
   wherein, to restrain unnecessary lifting and lowering operation of the document tray, completion of the switching to second setting screen is waited and the document tray lifting or lowering command is issued by suspending an elevation operation of the document tray according to the switched setting screen until the predetermined period elapses.

6. The reading apparatus according to claim 1,
   wherein the operations further include using outputs from a document length sensor and a document width sensor of the reading apparatus to predict a size of documents set on the document tray, and
   wherein the documents are nonstandard-size document in that the documents are other than a size that complies with the A, B, and C series of paper sizes in the international standard for paper sizes ISO 216.

7. The reading apparatus according to claim 6, wherein the documents are one of a receipt, a check, or a business form to be stacked by mixture on the document tray.

8. The reading apparatus according to claim 6, wherein the documents are documents of different sizes to be stacked on the document tray as mixed documents.

9. The reading apparatus according to claim 1,
wherein, in a case where a system control application determines that a running application does read nonstandard-size mixed documents and the predetermined period elapses from a previous lowering operation of the document tray, a reader control application controls a tray elevating motor to lower the document tray and controls a feed-roller elevating motor to lift a feed roller, and
wherein, in a case where the system control application determines that the running application does not read nonstandard-size mixed documents and the predetermined period elapses from a previous lifting operation of the document tray, the reader control application controls the tray elevating motor to lift the document tray and controls the feed-roller elevating motor to lower the feed roller.

10. The reading apparatus according to claim 1, wherein a business-form reading application configured to read nonstandard-size mixed documents is installed as the first function of the reading apparatus, and a copy setting application configured to read standard-size documents is installed as the second function of the reading apparatus.

11. A reading apparatus to convey a document set on a document tray and to read an image of the conveyed document, the reading apparatus comprising:
at least one processor that performs operations including:
performing lifting control for lifting the document tray in a case where a first condition is satisfied and performing lowering control for lowering the document tray in a case where a second condition is satisfied, and
judging whether a prescribed period elapses after lowering control of previous time is started,
wherein the lifting control is not performed even if the first condition is satisfied in a case where it is judged that the prescribed period does not elapse.

12. The reading apparatus according to claim 11,
wherein the operations further include selecting one of a first function and a second function, and
wherein the first condition is satisfied in a case where the first function is selected and where the document is set on the document tray.

13. The reading apparatus according to claim 12, wherein the second condition is satisfied in a case where the second function is selected and where the document is set on the document tray.

14. The reading apparatus according to claim 11,
wherein the operations further include selecting one of a first function and a second function, and
wherein the second condition is satisfied in a case where the second function is selected and where the document is set on the document tray.

15. The reading apparatus according to claim 11, wherein the first function is a business-form reading function for reading a business form.

16. The reading apparatus according to claim 15, wherein the second function is a copy function that is different from the business-form reading function.

17. A method for a reading apparatus to convey a document set on a document tray and to read an image of the conveyed document, the method comprising:
selecting one of a first function or a second function;
performing lifting control for lifting the document tray in a case where the document is set on the document tray and the first function is selected and performing lowering control for lowering the document tray in a case where the document is set on the document tray and the second function is selected;
obtaining time information; and
judging, based on the obtained time information, whether a predetermined period elapses,
wherein the lowering control is not performed based on judgment that the predetermined period does not elapse after performing lifting control of previous time even if a second condition is satisfied, and
wherein the lowering control is performed based on judgment that the predetermined period elapses if the second condition is satisfied.

18. A non-transitory computer-readable storage medium storing a program to cause a computer to perform a method for a reading apparatus to convey a document set on a document tray and to read an image of the conveyed document, the method comprising:
selecting one of a first function or a second function;
performing lifting control for lifting the document tray in a case where the document is set on the document tray and the first function is selected and performing lowering control for lowering the document tray in a case where the document is set on the document tray and the second function is selected;
obtaining time information; and
judging, based on the obtained time information, whether a predetermined period elapses,
wherein the lowering control is not performed based on judgment that the predetermined period does not elapse after performing lifting control of previous time even if a second condition is satisfied, and
wherein the lowering control is performed based on judgment that the predetermined period elapses if the second condition is satisfied.

* * * * *